June 20, 1967 IWAO NOGAMI ETAL 3,327,118

EXTENDED RANGE MEASURING AND RECORDING APPARATUS

Filed Sept. 6, 1963

INVENTORS.
IWAO NOGAMI
TOSHIO NAKAGAWA
BY Arthur H. Swanson 3,327,118
EXTENDED RANGE MEASURING AND
RECORDING APPARATUS
Iwao Nogami, Shinjuku, Tokyo, and Toshio Nakagawa, Yokohama, Kanagawa Prefecture, Japan, assignors to Honeywell Inc., a corporation of Delaware
Filed Sept. 6, 1963, Ser. No. 307,217
Claims priority, application Japan, Sept. 10, 1962, 37/38,478
1 Claim. (Cl. 250—83.3)

The present invention relates to a device measuring variables the values of which change over a wide range. For example, in the prior art a logarithm counting ratio meter used for the measurement of neutron flux density at the time an atomic reactor is being started-up cannot cover all the range of variations in the neutron flux density, and therefore measurements are carried out by periodically moving a counter tube away from the center of the reactor and utilizing a relationship between distances and damping or decrement in the tube output.

However, since, during the time a counter tube is being moved away from the center of the reactor, the measurement of neutron flux density cannot be carried out, a device for a continuous measurement of such density by establishing two measuring systems is provided in accordance with the present invention.

The object of the present invention is to provide such a measuring device which can be applied to all cases in which there exists a relationship between distances and decrement, with values which vary over a wide range.

Figure 1:
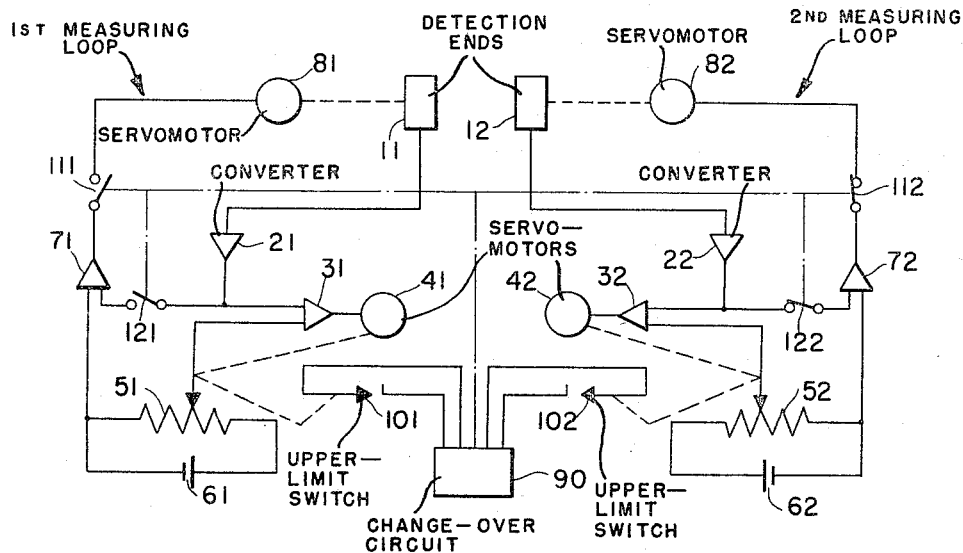
Figure 2:
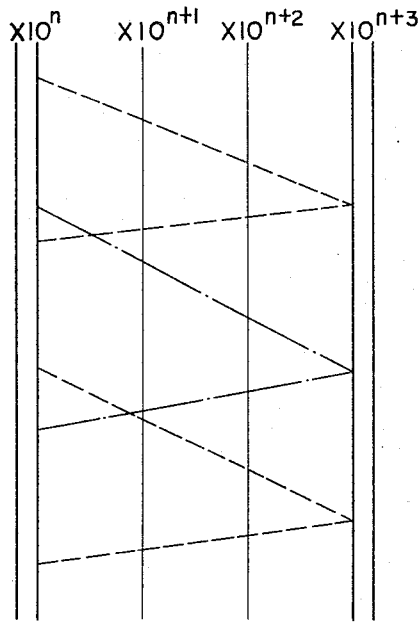

The object and advantage of this invention will become readily apparent from the following detailed description, in which:

FIG. 1 is a block a diagram showing one embodiment of a measuring device related to this invention, and FIG. 2 is a view showing one example of records made by the FIG. 1 device.

A measuring device in accordance with the present invention consists of, as shown in FIG. 1, the 1st measuring loop and the 2nd measuring loop, each comprising a detection ends, such as a neutron flux detector, a graphic meter and a location control device for the detection end. 11 and 12 are detection ends, 21 and 22 are converters which change a measuring amount to a voltage, and 31 and 32 are deflection or differential amplifiers for automatic equilibrium graphic meters, such as self-balancing potentiometric recorders. Each of these amplifiers amplifies the difference between an input signal voltage from a respective one of the detection ends 11 and 12 and a reference voltage from a respective one of slidewire resistors 51 and 52 having respective electric power sources 61 and 62. The outputs of amplifiers 31 and 32 are applied to respective servomotors 41 and 42.

101 and 102 are upper-limit switches; they close when sliding members of said sliding resistors 51 and 52 reach an upper-limit point, make change-over circuit 90 operate, and switch change-over switches 111 and 121, and 112 and 122, alternately.

71 and 72 are deflection amplifiers; to one input of each, a reference voltage from the respective one of sources 61 and 62 is given, and to the other input of each, an input signal voltage is given through switches 121 and 122 respectively. A location control device is formed by servomotors 81 and 82 and said circuit 90, and the movements of the detection ends 11 and 12 are controlled by the respective motors 81 and 82.

Next, we will explain the operation of the measuring device in accordance with this invention. First of all, switches 111 and 121 are put in the OFF or open position as shown, switches 112 and 122 are put in the ON or closed position as shown, the 1st measuring loop is made to record the output of detection end 11, and the 2nd measuring loop is made to move the detection end 12 and to trace reference points of measurement, as explained below. Under this condition, an input signal from detection end 11 is changed by converter 21 to a voltage and is given to one of the inputs of deflection amplifier 31. To the other input of said deflection amplifier 31, a reference point voltage is given from the measuring circuit consisting of sliding resistor 51 and electric power source 61 of said automatic equilibrium type graphic meter. The difference between these input voltages is amplified and given to said servomotor 41, and sliding member of said sliding resistor 51 is moved by said servomotor 41 so as to eliminate said difference, and the recording of the output of detection end 11 is carried out simultaneously. As the neutron flux increases and the signal voltage is raised, the sliding member of said sliding resistor 51 moves towards the upper-limit point; when said member reaches the upper-limit point, said sliding member closes upper-limit switch 101 and activates change-over circuit 90, puts change-over switches 111 and 121 in a closed position and change-over switches 112 and 122 in an open position, and changes over the condition of the 1st measuring loop and the 2nd measuring loop. Then the movement of detection end 12 stops and the 2nd measuring loop carries out the recording of the amounts measured. At the same time, in the 1st measuring loop, an input signal voltage is given to deflection amplifier 71, servomotor 81 is made to work, and the detection end 11 is moved from the object of measurement in order to eliminate the difference between the voltage from the converter 21 and the reference point voltage from the source 61. Said movement is continued even if the sliding member of the sliding resistor 51 reaches the reference point of the measurement, is it and its corresponding recording pen are moved down-scale by the servomotor 41 as the detection end 11 is moved away from its prior position by the servomotor 81. The reference point of measurement to which the sliding member of the resistor 51 and the corresponding recording pen are moved by the servomotor 41 at this time corresponds to the lower limit of the recorder, and actually expresses the point that the recorder indicates when the detection end 11 has been moved a certain distance from its prior position. When the sliding member of the sliding resistor 52 of the 2nd measuring loop reaches the upper-limit point, said movement is stopped by activating the change-over circuit 90.

Therefore, when one of the two measuring loops is used for measurement and recording, the other measuring loop is made to trace the reference point of the measurement by having its detection end move, and continuous recording can always be made by repeating the above actions alternately. Moreover, there is no necessity of correction should there exist a difference of characteristics between the detection ends of said two measuring loops. Further, they have the advantage that the graphic recorder can be used from zero to its full scale.

FIG. 2 is an example of the recording made by the FIG. 1 device assuming that the graphic meters including the servomotors 41 and 42 are combined as a two-pen instrument. The line of $X10^n$ shows reference points of measurements and the line of $X10^{n+3}$ shows upper-limit points. For the sake of convenience, the records of the 1st measuring loop are shown by broken lines and the records of the 2nd measuring loop are shown by one dot chain lines.

In FIG. 2, the uppermost broken line represents the values of neutron flux measured by the 1st measuring loop for the existing position of the detection end 11, this line showing an increase in the flux with time. Similiarly, the uppermost one dot chain line represents the values of flux measured by the 2nd measuring loop for the existing position of the detection end 12. However, the flux value represented by any point on this line is greater than that represented by the corresponding point on the uppermost broken line by an amount equal to the flux value represented by the latter at its extreme right-hand end. Thus, each successive measuring line represents flux values in excess of the highest value represented by the previous line. The second broken line from the top, as well as the other lines substantially parallel to it, represent the neutron flux values recorded by the corresponding loops for establishing reference points of measurements as the corresponding detection ends are moved away from their previous measuring positions and away from the object of measurement.

As mentioned above, the measuring device in accordance with the present invention can be used for the measurement of any variables which have a relationship of distance v. decrement with value which vary over a wide range. Thus, the device according to the invention is not limited to the measurement of neutron flux, but can be used for the measurement of light, electric field, and magnetic field intensity. Accordingly, this device has considerable practical utility.

While a preferred embodiment of the present invention is disclosed, it is recognized that the scope of the present invention is not limited thereto and it is therefore intended that the scope of the present invention be defined by the scope of the appended claim.

What is claimed is:

A measuring device having a first loop and a second loop, each including a detection end, a graphic meter, and means for moving said detection end, a change-over circuit operative in a first condition to cause said detection end of said first loop to actuate said meter of said first loop to provide a measure and record of the output of the last-mentioned detection end, and simultaneously to cause said means of said second loop to move said detection end of said second loop to cause said meter of said second loop to provide a measure and record of reference points corresponding to such movement, said circuit being operative in a second condition to cause said detection end of said second loop to actuate said meter of said second loop to provide a measure and record of the output of the last-mentioned detection end, and simultaneously to cause said means of said first loop to move said detection end of said first loop to cause said meter of said first loop to provide a measure and record of reference points corresponding to such movement, and means actuated by said meters for placing said circuit in its said first condition when said meter of said second loop is actuated to an upper measuring limit point, and for placing said circuit in its said second condition when said meter of said first loop is actuated to an upper measuring limit point.

References Cited

UNITED STATES PATENTS 2,964,633   12/1960   Bernstein ---------- 250—83.3
2,968,729    1/1961   Pepper et al. -------- 250—83.3

RALPH G. NILSON, *Primary Examiner.*

M. ABRAMSON, *Assistant Examiner.*